Aug. 9, 1932.  I. SHAFER  1,871,089
CONFECTION COATING APPARATUS
Filed April 7, 1931  5 Sheets-Sheet 1
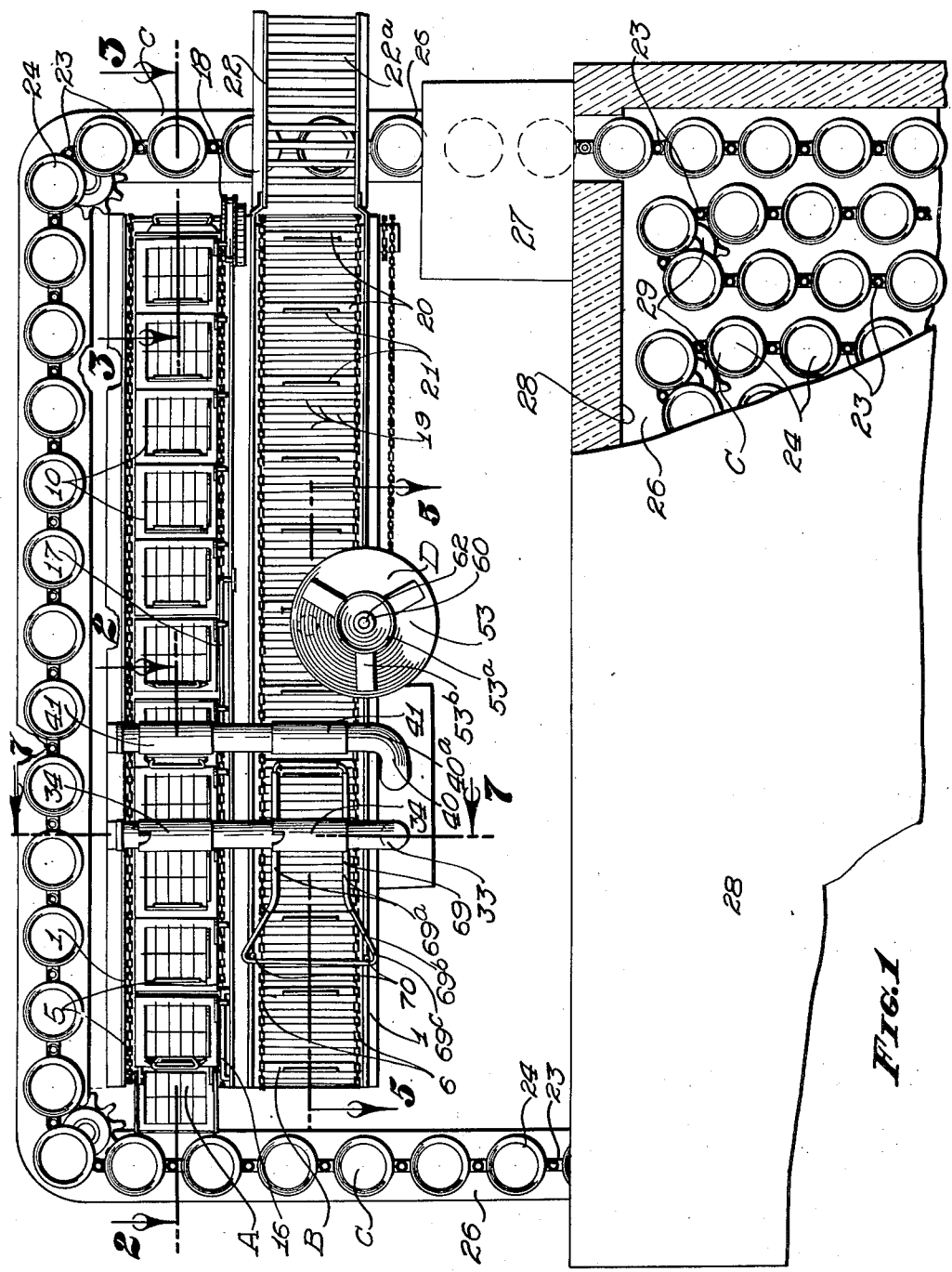
INVENTOR
IRA SHAFER
BY A. B. Bowman
ATTORNEY

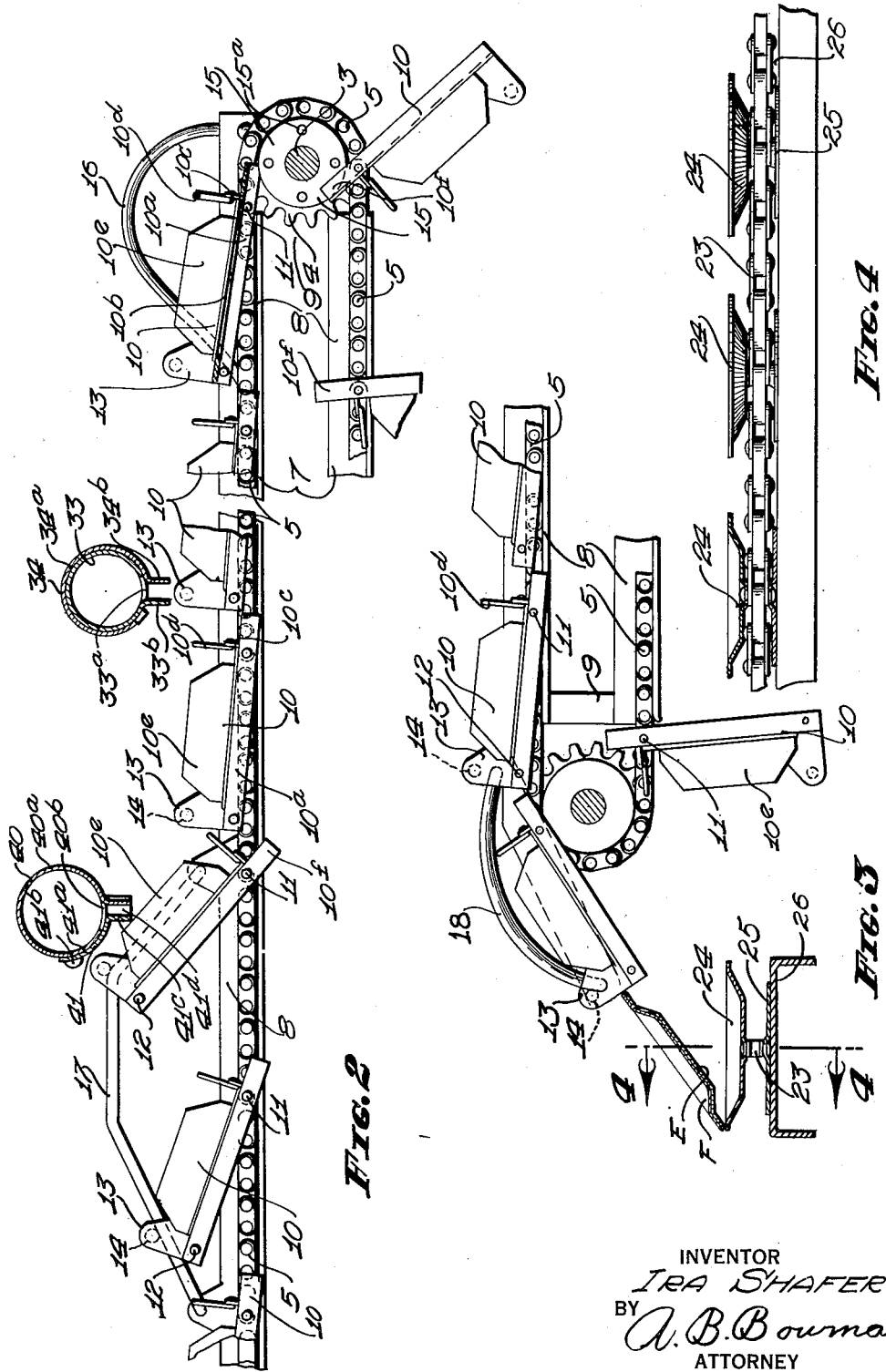

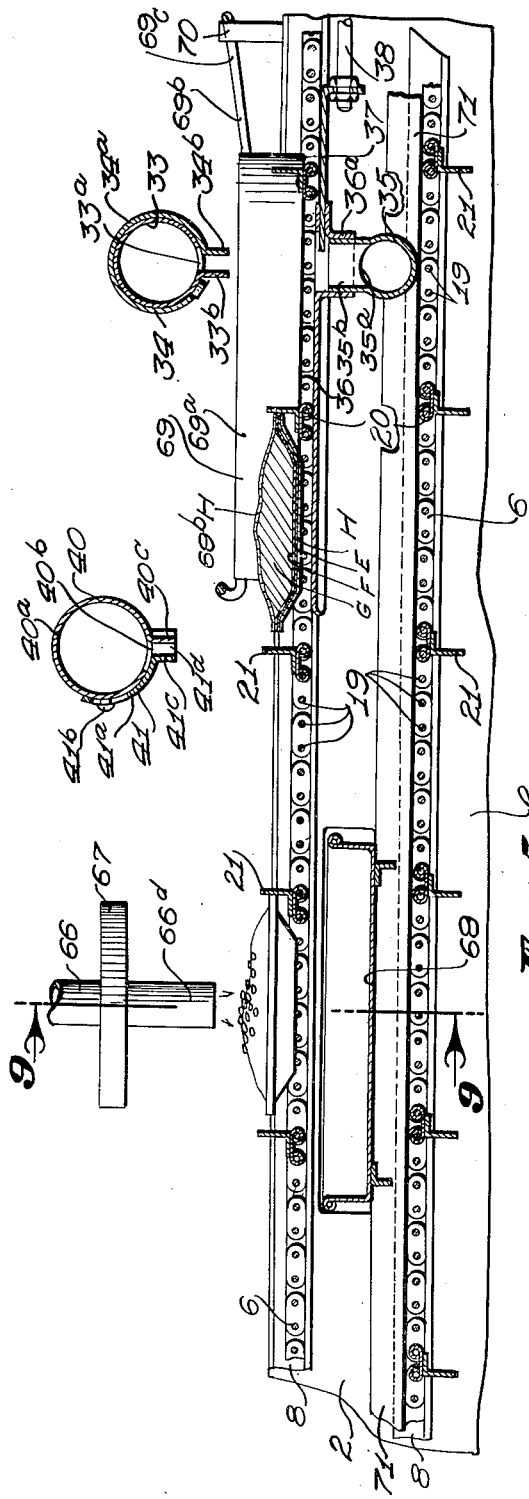
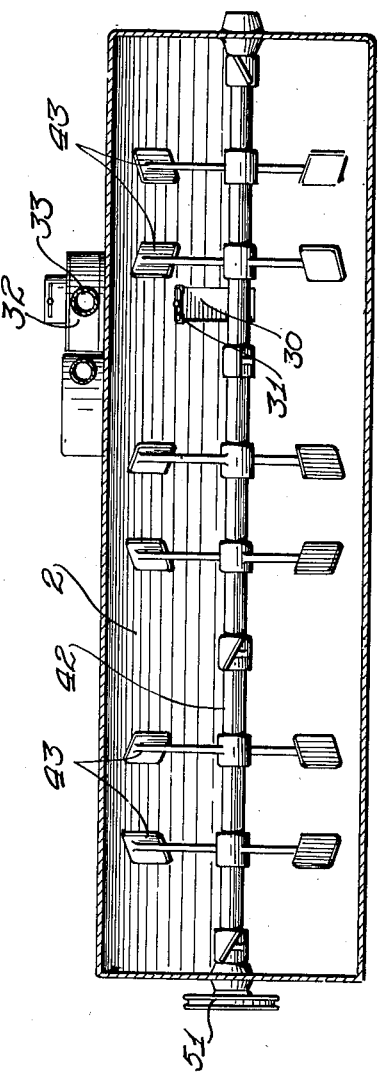

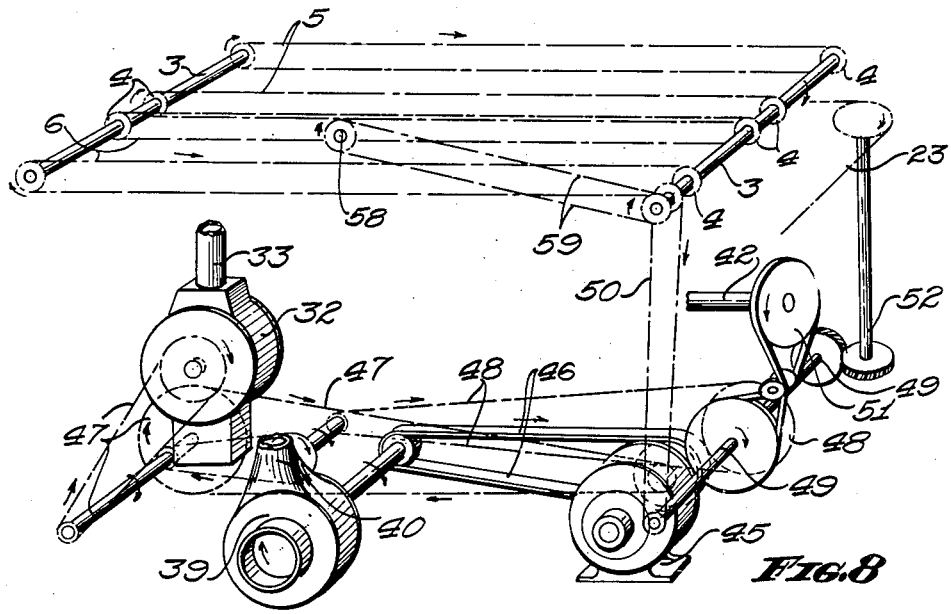
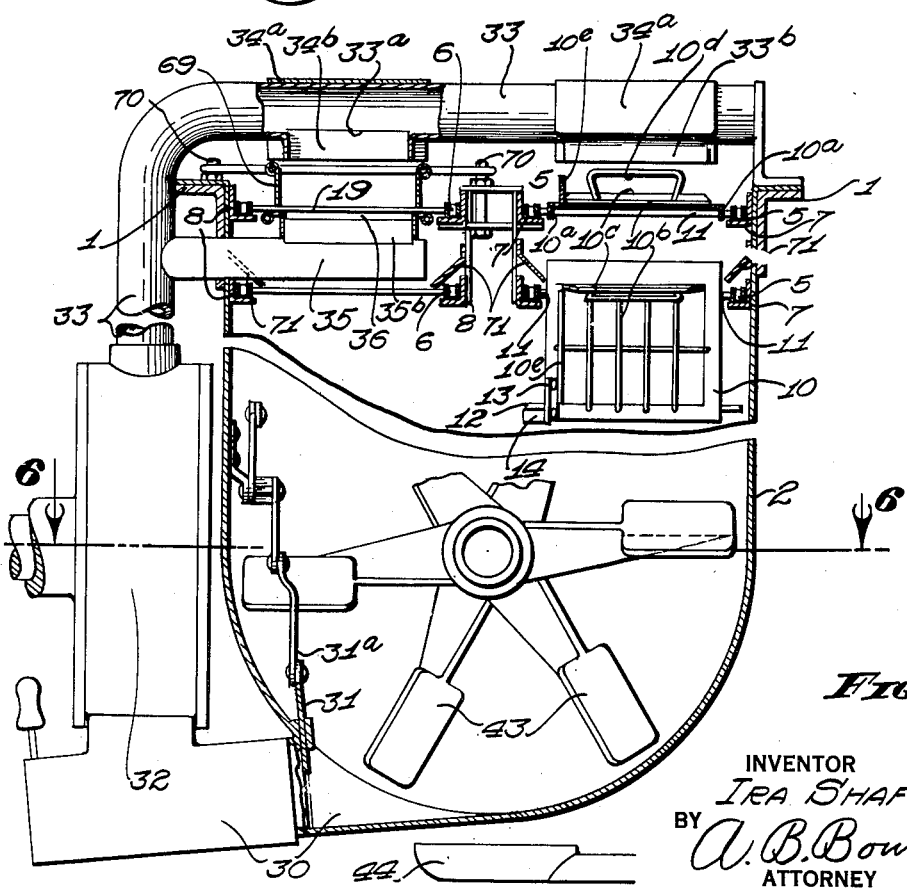

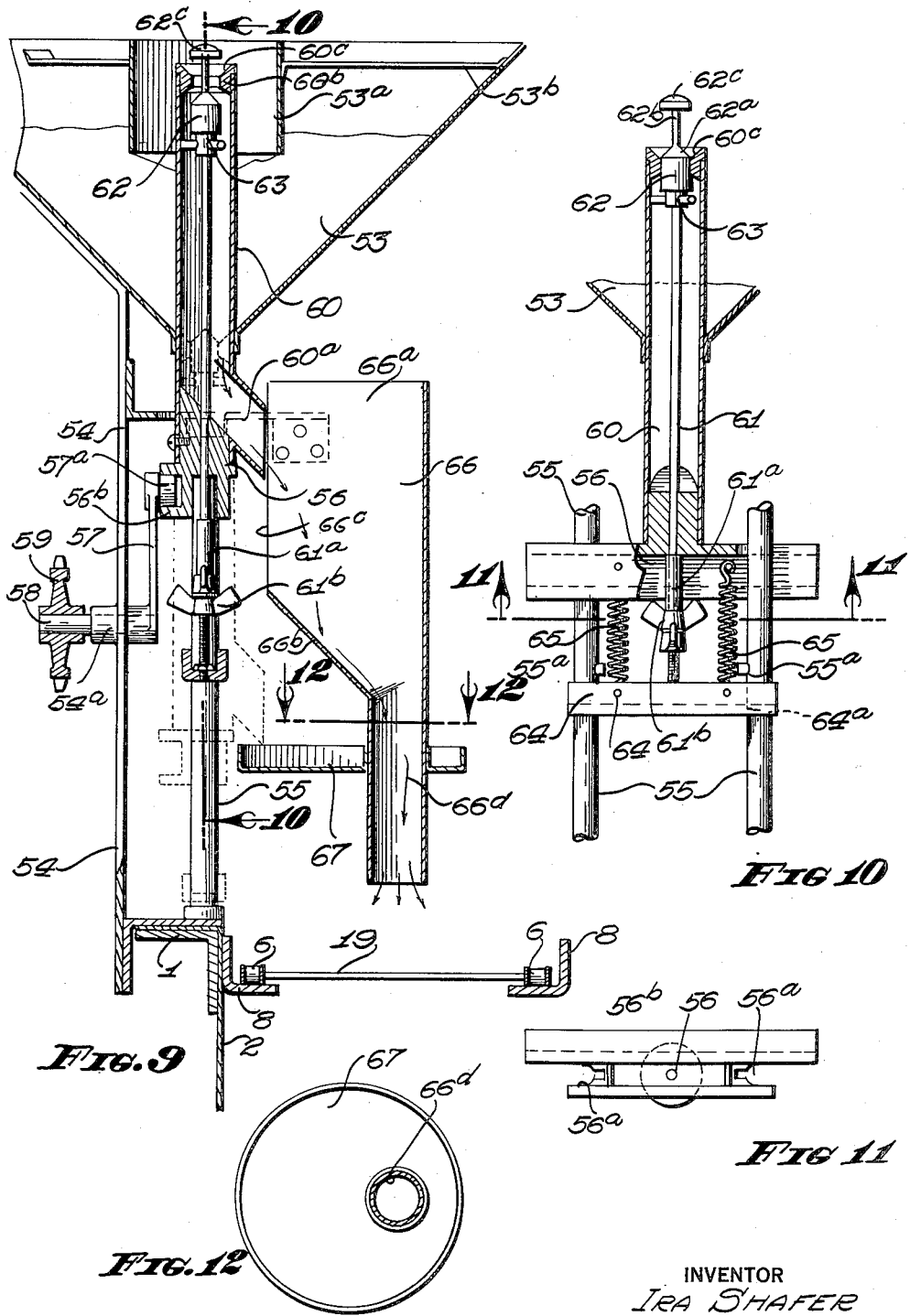

Patented Aug. 9, 1932

1,871,089

UNITED STATES PATENT OFFICE

IRA SHAFER, OF SAN DIEGO, CALIFORNIA

CONFECTION COATING APPARATUS

Application filed April 7, 1931. Serial No. 528,278.

My invention relates to confection coating apparatus and the objects of my invention are:

First, to provide an apparatus of this class which is particularly adapted for coating confections requiring two coating operations;

Second, to provide an apparatus of this class which utilizes a drying or hardening means in conjunction with the coating mechanism said drying means being arranged to act immediately after the coating mechanism, thereby eliminating a long or slow moving conveyor in order to permit proper drying or hardening of the coating, hence enabling the apparatus to operate at a relatively high speed;

Third, to provide an apparatus of this class which is particularly arranged to coat the interior of dish or cup shaped confections while right side up, there being provided an arrangement whereby such confections are tilted so as to drain out excess coating material;

Fourth, to provide an apparatus of this class in which the drainage or excess coating material from dish or cup shaped confections is facilitated by a stream of air which in addition serves to hasten the drying or hardening of the coating remaining in the confection;

Fifth, to provide an apparatus of this class which greatly reduces the amount of manual handling of the confection during its coating operation;

Sixth, to provide a novel conveyor structure for an apparatus of this class in which successive lengths of said conveyor may be arranged in a zig-zag fashion so as to accommodate a large portion of its length in a space of small area, thereby permitting the use of a relatively small sized refrigerating chamber for confections requiring a freezing operation in their preparation;

Seventh, to provide an apparatus of this class which may be readily maintained in a clean sanitary condition;

Eighth, to provide an apparatus of this class, which coats both sides of the confection simultaneously or only one side thereof if desired; and Ninth, to provide on the whole a novelly constructed confection coating apparatus, which is simple of construction and of operation proportional to its function, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a plan view of my confection coating apparatus with parts and portions shown fragmentarily; Fig. 2 is an enlarged fragmentary sectional view through 2—2 of Fig. 1; Fig. 3 is an enlarged fragmentary sectional view through 3—3 of Fig. 1 with parts and portions shown in elevation; Fig. 4 is a fragmentary sectional view through 4—4 of Fig. 3 with parts and portions as shown in elevation; Fig. 5 is a fragmentary sectional view through 5—5 of Fig. 1 with parts and portions as shown in elevation; Fig. 6 is a sectional view of the coating material reservoir taken through 6—6 of Fig. 7 with parts and portions shown in elevation; Fig. 7 is an enlarged transverse sectional view taken through 7—7 of Fig. 1; Fig. 8 is a perspective diagrammatical view of the operating mechanism for my confection coating apparatus; Fig. 9 is a sectional view taken through 9—9 of Fig. 5 illustrating particularly the nut dispensing mechanism; Fig. 10 is a sectional view through 10—10 of Fig. 9 showing the mechanism of the nut dispenser in a different relation than that illustrated in Fig. 9; Fig. 11 is a bottom view of the upper traveler bar as viewed through 11—11 of Fig. 10; and Fig. 12 is a sectional view through 12—12 of Fig. 9.

Similar characters of reference refer to similar parts and portions throughout the several views of the drawings.

Frame members 1, coating material reservoir 2, shafts 3, sprocket wheels 4, conveyor chains 5 and 6, conveyor guide brackets 7 and 8, inner frame work 9, trays 10, journal pins 11, stop pins 12, brackets 13, cam riders 14, guide wheels 15, positioning cam 16, tilting cam 17, discharging guide 18, cross rods 19, supports 20, ridge members 21, chute 22, conveyor chain 23, plate members 24, slide plates 25, track 26, ice cream or filler dispensing device 27, refrigerating chamber 28, sprocket wheels 29, outlet tube 30, gate 31, pump 32, main discharge pipe 33, valve member 34, auxiliary discharge pipe 35, spreading plate 36, slide gate 37, control mechanism 38, blower 39, air pipe 40, valve member 41, shaft 42, paddles 43, heating means 44, motor 45, belt and pulley arrangement 46, driving mechanism 47, sprocket and chain means 48, countershaft 49, connecting means 50, pulley and belt means 51, gear and shaft means 52, hopper 53, support 54, guide rods 55, traveler bar 56, crank arm 57, shaft 58, sprocket and chain means 59, discharge tube 60, plunger rod 61, plunger 62, spider member 63, traveler member 64, springs 65, continuing chute 66, trays 67, and 68, guide structure 69, retaining pins 70, and conveyor chain aprons or shields 71, constitute the principal parts and portions of my novel confection coating apparatus.

A pair of frame members 1 are provided which are arranged in parallel disposed relation and support opposite sides of a coating material reservoir 2 which depends therefrom. The reservoir 2 is provided with a semi-cylindrical bottom portion and vertically extending sides continuing upwardly therefrom.

At their ends, the frame members 1 are connected by shafts 3. Each shaft 3 is provided with two pairs of sprocket wheels 4. Each pair of sprocket wheels on one shaft has a corresponding pair of sprocket wheels on the other shaft, one set of sprocket wheels so arranged, is adapted to receive conveyor chains 5 while the other set of sprocket wheels receive conveyor chains 6. The conveyor chains 5 and 6 form elements of conveyor mechanisms A and B respectively.

The upper and lower levels of the conveyor chains 5 and 6 are prevented from sagging by means of guide brackets 7 and 8 respectively which may be in the form of lengths of angle iron. The guide brackets for the outer member of each set of conveyor chains are secured to the inner sides of the frame members 1 or to the upper portion of the reservoir as shown best in Fig. 7. The remaining or inner guide brackets are supported at the ends of the reservoir and are inter-connected intermediate their ends by means of suitable inner framework 9 in the form of braces or the like.

The conveyor mechanism A including the conveyor chains 5 also include a plurality of trays 10. Each tray 10 is in the form of a rectangular hollow frame with depending flanges 10a along its side margin. The opening formed by the frame occupies a major portion of its area and is traversed by suitable lattice work 10b. Along the rear margin of the latticed opening is a low, upturned flange 10c which supports the ends of a substantially U-shaped member. Said member may be constructed of wire and forms with the upturned flange an elongated, rectangular loop 10d. The inner margin of the latticed opening is provided with an upturned wall which forms a side stop 10e.

Each tray 10 is rotatably mounted upon a journal pin 11 which pierces the depending flanges 10a in offset relation to the center of gravity of said tray, whereby the shorter extension designated 10f of said tray extends towards the loading end of the conveyor structure A when said tray is on the upper level of said conveyor structure, and projects upwardly when carried by the lower level of said conveyor structure. The protruding ends of each journal pin 11 are secured in or between opposite links of the conveyor chains 5. The forward portions of the depending flanges 10a are pierced by a transversely extending stop pin 12 which protrudes from the sides of the tray so as to rest upon the conveyor chains 5 when said tray is on the upper level thereof and support said tray in a substantially horizontal position.

At the inner corner of each tray 10 above the corresponding end of the stop pin 12 is a small bracket 13 which supports at its upper end a laterally extending cam rider 14.

The shaft 3 arranged at the forward or loading end of the conveyor structure A is provided with guide wheels 15 arranged between the corresponding sprocket wheels 4. The guide wheels 15 are rigidly connected together by means of tie rods 15a and are secured to the shaft 3. The function of the guide wheels 15 is shown best in Fig. 2. The guide wheels 15 are arranged to engage the margins of the shorter extensions 10f of the trays as the journal pins 11 carry the trays around the forward sprockets 4 so as to raise the longer extensions of said trays and turn said trays right side up upon reaching the upper level of the conveyor structure A.

In order to prevent the trays from dropping too rapidly after they have passed their centers of gravity, a positioning cam 16 is mounted along one side of the conveyor structure A, preferably on the inner side thereof, so as to engage the inner projections of the stop pins 12. The positioning cam 16 allows the trays to gradually assume their substantially horizontal position upon the upper level of the conveyor chains.

For purposes which will be set out more fully hereinafter, it is desired to tilt the trays during part of their travel along the upper level of the conveyor chains 5. This is accomplished by a tilting cam 17 which is in the form of a bar supported by the inner framework 9. The tilting cam 17 is bent so as to form an incline at its forward portion 17a which connects to an elevated, level portion 17b which, in turn, connects to a decline portion 17c. The tilting cam 17 is engaged by the cam riders 14 which extend from the brackets 13 as shown best in Fig. 2.

At the discharge end of the conveyors 5 there is provided a discharging guide 18 which may be in the form of a bent rod supported from the inner framework 9 and which is also adapted to be engaged by the cam riders 14. The discharging guide 18 carries the extended forward end of each tray beyond the discharge end of the conveyor chains as shown in Fig. 3 then curves downwardly so that each tray assumes a steeply inclined position before dropping to a vertical, hanging position; whereby each tray discharges its contents in a predetermined manner. The purpose of this movement will be discussed more fully hereinafter.

Now referring to the conveyor structure B which is located in parallel disposed relation with the conveyor structure A, the corresponding links of the two conveyor chains 6 are connected together by cross rods 19 which may be formed of wire. Each link of each chain receives an end of a cross rod which may form its journal pin. The conveyor structure B is, therefore, in the form of a traveling grating.

Secured at intervals to adjacent pairs of cross rods 19 are supports 20 which are formed of sheet material covering two of the cross rods and curled there around along its margins as shown best in Fig. 5. Each support 20 has secured thereto an upwardly extending ridge member 21 terminating short of the side margins of the conveyor structure B. The ridge members are spaced apart a distance approximately equal to the distance between the successive trays 10 as shown best in Fig. 1. When carried by the upper level of the conveyor chains, the ridge members extend upwardly hence they depend from the conveyor when supported by the lower levels of the chain as shown in Fig. 5.

Extending from the discharge end of the conveyor structure B is a declined chute member 22 preferably provided with rollers 22a whereby the slope of the chute need not be great.

In addition to the conveyor structures A and B, there is provided a third conveyor structure C which receives articles discharged from the conveyor structure A. The conveyor structure C includes a conveyor chain 23 arranged so as to curve about a vertical axis. The conveyor chain 23 supports a plurality of plate members at its upper side which are dished out or concave at their upper sides. Secured to the under side of the conveyor chain 23 underneath each plate member 24 is a slide plate 25 which is adapted to rest upon a track 26 in the form of a flat horizontally disposed band.

The conveyor structure C extends across the discharge end of the conveyor structure A underneath the chute 22 and underneath an ice cream or other filler dispensing device 27 shown diagrammatically in Fig. 1. From here the conveyor passes into a refrigerating chamber 28. Within the refrigerating chamber, the conveyor chain 23 is doubled back and forth in zig-zag fashion with successive lengths thereof in parallel disposed adjacent relation. This is accomplished by passing the conveyor chain about a plurality of sprocket wheels 29.

The refrigerator chamber which is shown fragmentarily in Fig. 1 is large enough to accommodate enough of the conveyor structure 23 to enable proper freezing of the ice cream or other filler of the confection during the period the confection is within the refrigerating chamber. The nature of the confection for which my apparatus is particularly adapted will be set out more fully in the description of the manner in which the apparatus operates.

From the refrigerating chamber, the conveyor structure C passes across the loading ends of the conveyors A and B, then along one side thereof to the point of beginning, there being provided other sprocket wheels 29 and the necessary corners of the conveyor structure. The conveyor structure C is driven in a suitable manner which permits timing thereof with the conveyor structure A whereby successive plates 24 pass the discharge end of the conveyor A at the proper time to receive a confection discharged from successive trays 10.

The conveyor structures A and B are arranged side by side and over the coating material reservoir 2 so as to enable the use of a common coating apparatus arranged to coat confections passing on either or both of the conveyors A and B, and to permit drainage of excess coating material back into the reservoir. Said coating apparatus includes a pump structure connected with the reservoir 2 and pipes for spraying or otherwise discharging the coating material in proper relation to the conveyor structures A and B. For this purpose the coating material reservoir is provided with a laterally extending outlet tube 30 as shown in Fig. 7. The receiving end of the outlet tube 30 is controlled by a suitable slide gate 31 operated by a suitable link and lever structure 31a in order to permit regulation of the gate from a convenient point. The outlet tube 30 is connected to the intake side of a suitable pump 32, the discharge side of which is connected to a main discharge pipe 33.

The main discharge pipe 33 extends upwardly until above the conveyor structures A and B and then horizontally thereover. Over each conveyor structure, the main discharge pipe 33 is provided with a slot 33a. A fixed, depending marginal ridge 33b is formed along one side of each slot 33a.

Each slot 33a is controlled by a valve member 34. Each valve member includes an arcuately curved portion or semi-cylindrical portion 34a having a curvature extending greater than 180° so as to rotate about an axis common with the discharge pipe. One margin of the semi-cylindrical portion 34a is provided with a radially extending ridge 34b which is adapted to coact with the marginal ridge 33b so as to form a discharge orifice therebetween. By adjusting the arcuate relation of the valve member 34 with respect to the main discharge pipe 33, the side of the discharge orifice therefrom may be regulated.

Extending laterally from the vertical portion of the main discharge pipe 33 so as to pass between the upper and lower levels of the conveyor chains 6 of the conveyor structure B is an auxiliary discharge pipe 35. The auxiliary discharge pipe is provided with an upwardly directed slot or orifice 35a bordered on all sides by an upwardly extending rim 35b. The rim 35b serves as support for a spreading plate 36. The spreading plate 36 is substantially rectangular in plan and extends rearwardly contiguous to the under side of the upper level of cross rods 19. The spreading plate 36 is provided with a depending sleeve portion 36a which is adapted to fit around the rim 35b as shown best in Fig. 5. A laterally disposed slot pierces one side of the sleeve 36a which is adapted to receive a slide gate 37 which may be adjusted by any suitable control mechanism 38 shown fragmentarily in Fig. 5. The slide gate 37 controls the orifice of the auxiliary discharge pipe. By properly adjusting the slide gates 31 and 37 and valve members 34, the total amount as well as the relative amounts of coating material delivered by the pump 32 may be controlled.

The orifices of the valve members 34 and 41 as well as that of the spreading plate 36 are wide enough to discharge against the major portion of the widths of the two conveyor structures A and B, the length of the slots being limited just enough to prevent direct discharge upon the chains 5 and 6.

Means are provided for directing a current of air upon the confection after the confection passes the coating apparatus. This means includes a blower 39 arranged to one side of and below the reservoir 2. The blower 39 and pump 32 are concealed by a common casing, as shown in Fig. 1 of the drawings. The outlet of the blower is connected with an air pipe 40 which extends upwardly until above the conveyor structures A and B and then horizontally thereacross.

The horizontal portion designated 40a of the air pipe, is provided with downwardly directed slots 40b, one over each conveyor structure A and B. One side of each slot 40b is bordered by a depending ridge 40c. Each slot 40b is equipped with a valve member 41 including an arcuate portion mounted on the air pipe by means of slots through which extend screws 41b. Each valve member is provided with a downwardly extending ridge 41c adapted to coact with the ridge 40c forming an orifice therebetween. The ends of the ridge 41c are provided with end members 41d which clear the ends of the ridge 40c so as to close the spaces between the ends of the ridges. The air pipe 40 extends over the incline portion of the tilting cam 17 associated with the conveyor structure A as shown in Fig. 2 so as to facilitate the discharge or excess coating material from cup shaped confection.

Horizontally mounted in the coating material reservoir 2 is a shaft 42 from which extend a series of paddles 43. A suitable heating means 44 such as a gas burner or electric heating coil may be provided underneath the reservoir 2 so as to maintain the contents thereof at a desired temperature. The heating means is shown diagrammatically in Fig. 7.

In order to properly time the various parts of the confection coating apparatus, these parts are preferably driven by a single motor 45. A belt and pulley arrangement 46 operated by the motor drives the blower 39 so as to rotate at the desired speed. A driving mechanism 47 independently connects the pump 32 with the motor 45 so as to rotate the pump 32 at a lower speed than the blower. A sprocket and chain means 48 operated by the driving mechanism 47 rotates a counter-shaft 49. A suitable connecting means 50 rotates one of the shafts 3, preferably at the discharge end of the conveyor structures A and B. A suitable pulley and belt means 51 connects the paddle operating shaft 42 with the counter shaft 49. The counter shaft 49 may also drive the conveyor C through suitable gear and shaft means 52 connected with one of the sprockets 29. The foregoing driving structure is shown diagrammatically in Fig. 8.

It is often desirable in order to make the confection appear more attractive to sprinkle chopped nuts, cocoanut or the like over the top of the confection. This is accomplished by the structure shown in detail in Figs. 9 to 12 inclusive and illustrated fragmentarily in Figs. 1 and 5.

The nut dispensing apparatus D includes a hopper 53 mounted above and to one side of the conveyor structure B upon a suitable support 54 which in turn is supported by one of the side frames 1. Inwardly of the support 54 underneath the hopper 53 are a pair of guide rods 55. The guide rods slidably receive therebetween, a traveler bar 56 which is guided relative to the rods by means of slots 56a provided in its extremities. The traveler bar 56 is also provided with a horizontally disposed channel 56b on its outer side which forms a track for a roller 57a mounted at the extended end of a crank arm 57. The crank arm is journaled in a bearing 54a mounted upon the support 54. The shaft 58 is driven by a sprocket and chain means from one of the shafts 3 as indicated in the diagrammatical view in Fig. 8. This arrangement enables the traveler bar 56 to be reciprocated upon the guide rod.

The hopper 53 is in the form of an inverted cone and the traveler bar 56 extends underneath the apex thereof. Secured by its lower end to the traveler bar is a discharge tube 60 which extends upwardly through the apex of the hopper 53. The discharge tube 60 is closed at its lower end by the traveler bar but is provided above the traveler bar with a downwardly and outwardly extending spout 60a which points towards the conveyor structure B. The upper end of the discharge tube 60 is provided with a constriction 60b having a depressed, conical upper surface designated 60c.

The traveler bar 56 is provided with a small passage therethrough in axial alinement with the discharge tube which slidably receives a plunger rod 61. The upper end of the plunger rod 61 is equipped with a plunger 62 arranged to form a snug sliding fit with the constriction 60b. Below the plunger 62, the plunger rod 61 is provided with a spider member 63 which spaces the plunger rod with respect to the discharge tube when the plunger 62 is free of the constriction 60b. The upper end 62a of the plunger 62 is conical and is provided with a thin stem 62b extending upwardly therefrom which terminates in a clearing head 62c which is arranged to pass downwardly through the constriction 60b upon upward movement of the discharge tube past the plunger.

The lower end of the plunger rod 61 is secured to a traveler member 64 which is provided with slots in its ends adapted to receive the guide rods 55. The traveler member 64 is mounted below the traveler bar 56. In order to limit the downward movement of the discharge tube 60 with respect to the plunger rod 61, the plunger rod 61 is equipped with a stop sleeve 61a and wing nuts 61b for effecting an adjustment thereof.

The guide rods 55 are provided with stop pins 55a which are adapted to be engaged by the traveler member 64 but which are cleared by the traveler bar 56. The traveler bar 56 and traveler member 64 are yieldably connected together by means of springs 65.

Suitably supported from the support 54 is a continuing chute 66. The continuing chute 66 includes vertically disposed side portions 66a which extend into contiguous relation with the extremity of the spout 60a of the discharge tube 60 as shown best in Fig. 9. The side portions are connected together at their edges remote from the spout 60a by a vertically disposed wall and across their lower edges by an incline floor 66b which terminates flush with the edges of the side portions contiguous to the spout 60a. The floor 66b and side portions 66a, thus form a receiving slot 66c adapted to receive material discharged from the spout 60a. The lower end of the inclined floor 66b terminates in a vertically disposed tube 66d which is located in centered relation over the conveyor structure B as shown best in Fig. 9. The tube 66d may extend through an eccentrically mounted tray 67 for catching crumbs which fail to enter the continuing tube.

In order to prevent excess amounts of chopped nuts or the like from falling into the reservoir 2 an additional tray 68 is provided underneath the upper level of the conveyor C as shown in Fig. 5. This tray may be removed through a slot provided in the side wall of the reservoir as shown.

The upper portion of the hopper 53 is provided with an open ended, cylindrical shell 53a which is concentrically supported above the apex of the hopper by webs 53b. When the hopper is filled, care is taken not to fill the shell 53a, so that the level of the chopped nuts or other material does not extend appreciably above the bottom edge thereof. The discharge tube is adapted to pass upwardly into the clear space formed within the shell 53b.

In order to properly center the confections as they pass along the conveyor B, particularly as they pass over the spreading plate 36, there is provided a guide structure 69. The guide structure 69 includes a pair of vertically disposed parallel related side walls 69a spaced far enough apart to clear the ends of the ridge member 21. The forward ends of the side walls 69a diverge slightly so that the ridge members 21 maintain said side walls in proper centered relation. The side walls 69a are connected together by a wire or rod framework 69b which includes a loop portion 69c arranged at the forward end of the guide structure high enough to clear the confection and adapted to fit over a pair of retaining pins 70 supported by the frame 1 and inner framework 9 as shown in Figs. 1 and 5. This arrangement enables the guide structure to be readily removed for cleaning.

In order to protect the conveyor chains 5 and 6, from the coating material, the lower levels of said conveyor chains are covered by aprons or shields 71. The upper levels of the conveyor chains need not be so covered as they are close enough to the outlets of the main discharge pipe 33 that the coating material therefrom may be regulated so as to miss the chains. The confection for which my apparatus is particularly adapted comprises a receptacle E in the form of an edible pastry or cake. The receptacle is quite thin and is coated first on the inside with a moisture proof coating such as melted chocolate designated F. The receptacle is then filled with ice cream or other frozen confection G; then the entire outer sides of the ice cream and receptacle are again coated as indicated by H with the water proofing chocolate coating material. After this is done, a few crushed nuts are sprinkled on top of the completed confection, whereupon the confection is ready for storage and sale.

Operation of my apparatus is as follows: The receptacle E is placed on a tray 10 just after it has reached the upper level of the conveyor A before it passes under a slot in the main discharge pipe 33. As the receptacle E passes under the discharge pipe, it is filled with the coating material. Continued movement of the tray causes the tilting cam 17 to act upon the cam rider and tilt the forward end of the tray as shown in Fig. 2. The receptacle is retained on the tray by the loop 10d, but the coating material is free to drain out. Drainage of the coating material is assisted by a current of air from the air pipe 40 which also dries or cools the coating so as to harden it.

At the discharge end of the conveyor A, the receptacle with its inner or concave side coated is discharged into one of the plate members 24 of the conveyor structure C, which is timed to reach the proper position when the receptacle is ready to land therein. While carried by the conveyor structure C, the receptacle E passes under the dispensor 27 and receives a filling of ice cream or the like G. The conveyor then passes into the refrigerating chamber where the ice cream is frozen to the desired temperature.

The conveyor issues from the freezing chamber and passes in front of the loading ends of the conveyors A and B so that the operator who places the receptacle E on the conveyor A may now take the receptacle with the ice cream therein and place it on the conveyor B.

On the conveyor b, the confection passes between the discharge slot of the main discharge pipe and over the spreading plate 36 upon which upwells coating material from the auxiliary discharge pipe 35, thus both the bottom and upper sides of the confection receive the coating material simultaneously. After receiving the double or last coating, the confection passes under the remaining outlet of the air pipe 40 which assists in cooling and hardening the coating material as well as facilitating drainage of excess amount.

The top of the confection still remains damp enough to be somewhat sticky for a few seconds after passing the air pipe so that as it passes under the nut dispensing apparatus D, it retains a small amount of chopped nuts sprinkled thereon. By this time the confection is completely dry, and passes from the conveyor B to the chute 22 and thence on to any other suitable conveyor for the purposes of packing or storing the confection.

The nut dispensing apparatus operates as follows: A quantity of chopped nuts are poured into the hopper 53 leaving the space within the shell 53a clear. The discharge tube 60, when at the bottom of its stroke, occupies the dotted line position shown in Fig. 9. In this position the plunger is within the constriction 60b so that their corresponding conical upper surfaces 62a and 60b form an annular V-shaped groove or channel. The plunger 62 and discharge tube 60 move in unison until the tube has entered the shell 53a. After the discharge tube 60 has passed above the level of the chopped nuts within the shell 53a, further upward movement of the plunger 62 is limited by action of the lugs 55a on the traveler member 64. Continued upper movement of the discharge tube 60 raises the constriction 60b above the plunger, whereupon the conical pile of chopped nuts supported above the discharge tube 60 pass downwardly around the plunger 62, out the spout 60a into the continuing chute 66, through the tube 66d and on top of the confection as it passes thereunder. The clearing head 62c insures against accidental sticking of particles of nuts. By adjusting the wing nuts 61b, the normal position of the plunger 62 may be controlled so as to regulate the amount of nuts which will pile upon the upper ends of the plunger and discharge tube.

Though I have shown and described a particular construction, combination, and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a confection coating apparatus, a conveyor including a plurality of foraminous, tiltable trays arranged to carry dish-shaped confections, a coating material discharge spout arranged to discharge its contents into said confections, means for tilting said trays, said means positioned so as to act upon said trays after they pass said discharge spout, retainers carried by said trays for retaining said confections thereon while said trays are tilted whereby excess coating material may drain from said confections, a blower, and a conduit leading therefrom to a position contiguous to said conveyor for discharging a hardening medium against the coating material, said conduit being disposed over said tilting means for assisting in draining said confections by impelling the excess coating material therefrom.

2. In an apparatus of the class described, a pair of conveyor structures for carrying confections arranged side by side, a coating material pipe common to said conveyor structures extending transversely thereacross, spouts associated with said pipe for discharging its contents upon confections carried by each of said conveyor structures, a blower, and a conduit leading therefrom and extending across both of said conveyor structures, said conduit provided with discharge orifices for directing a hardening medium against said confections subsequent to the coating of said confections by said coating material.

3. In an apparatus of the class described, a pair of conveyor structures arranged side by side, the one conveyor structure including tray members for receiving dish-shaped confections, the other of said conveyor structures arranged to receive said confections after their being filled, a coating material pipe extending across said conveyor structures, spouts associated with said pipe for discharging its contents upon confections carried by said conveyor structures, a tilting means engageable by said tray members of said one conveyor structure as said tray members pass a given point and retainers on said tray members for holding said confections thereon while said trays are tilted whereby excess coating material may drain from said confections.

4. In an apparatus of the class described, a pair of conveyor structures arranged side by side, the one conveyor structure including tray members for receiving dish-shaped confections, the other of said conveyor structures arranged to receive said confections after their being filled, a coating material pipe extending across said conveyor structures, spouts associated with said pipe for discharging its contents upon confections carried by said conveyor structures, a tilting means engageable by said tray members of said one conveyor structure as said tray members pass a given point, retainers on said tray members, for holding said confections thereon while said trays are tilted whereby excess coating material may drain from said confections a blower, and a conduit leading therefrom and extending across both of said conveyor structures, said conduit provided with discharge orifices for directing a hardening medium against said confections subsequent to the coating of said confections with said coating material, the discharge orifice for said one conveyor structure being arranged over said tilting means so as to assist the action thereof by impelling excess coating material from said confections.

5. In a confection coating apparatus, a conveyor, a dispensing means associated therewith including a hopper, for receiving substances in the form of small particles, a reciprocable discharge tube extending upwardly through said hopper shiftable from a position below the level of said substance to a position above said substance, driving means timed with the movement of said conveyor for reciprocating said discharge tube, valve means associated with said discharge tube at the upper end thereof, said valve means normally closed and forming with said tube a receptacle for receiving a limited amount of said substance, said valve means arranged to open when the upper extremity of said tube clears said substance whereby said substance trapped by said receptacle discharges through said tube and onto articles passing along said conveyor.

6. In a confection coating apparatus, a pair of conveyors arranged side by side, the one conveyor arranged to carry confections receiving a first coating, the other conveyor arranged to carry confections receiving a second coating, a coating mechanism associated with both of said conveyors for applying a coating of material to said confections as they pass upon said conveyors, a third conveyor arranged to receive confections from said one conveyor and transport them to a position for placement upon said other conveyor, and a refrigeration chamber enclosing a section of said third conveyor.

7. In a confection coating apparatus, a first conveyor arranged to carry dished confections, coating means associated with said first conveyor for applying a coating of material to the interior of said dished confections, an intermediate conveyor arranged to receive said dished confections from said first conveyor, a dispenser arranged over said intermediate conveyor for filling said dished confections, a freezing chamber enclosing a section of said intermediate conveyor, a final conveyor, said intermediate conveyor arranged to transport said confections to a position for placement upon said final conveyor, and coating means associated with said final conveyor for applying a coating to the entire surfaces of said confections as they pass on said final conveyor.

8. In a confection coating apparatus, a pair of conveyors arranged side by side, the one conveyor arranged to carry confections receiving a first coating, the other conveyor arranged to carry confections receiving a second coating, a coating mechanism associated with both of said conveyors for applying a coating of material to said confections as they pass upon said conveyors, a third conveyor arranged to receive confections from said one conveyor and transport them to a position for placement upon said other conveyor, a refrigeration chamber enclosing a section of said third conveyor, an air blower, and an air conduit leading therefrom and associated with said one and said other conveyors, said conduit provided with discharge slots for directing a current of air upon the coatings formed on said confections as they pass on said conveyors.

9. In a confection coating apparatus, a first conveyor arranged to carry dished confections, coating means associated with said first conveyor for applying a coating of material to the interior of said dished confections, an intermediate conveyor arranged to receive said dished confections from said first conveyor, a dispensor arranged over said intermediate conveyor for filling said dished confections, a freezing chamber enclosing a section of said intermediate conveyor, a final conveyor, said intermediate conveyor arranged to transport said confections to a position for placement upon said final conveyor, coating means associated with said final conveyor for applying a coating to the entire surfaces of said confections as they pass on said final conveyor, an air blower, and an air conduit leading therefrom and extending over said first and final conveyors, said conduit provided with discharge slots for directing a current of air upon coatings formed on said confections.

10. In a confection coating apparatus, a first conveyor arranged to carry dished confections, coating means associated with said first conveyor for applying a coating of material to the interior of said dished confections, an intermediate conveyor arranged to receive said dished confections from said first conveyor, a dispensor arranged over said intermediate conveyor for filling said dished confections, a freezing chamber enclosing a section of said intermediate conveyor, a final conveyor, said intermediate conveyor arranged to transport said confections to a position for placement upon said final conveyor, coating means associated with said final conveyor for applying a coating to the entire surfaces of said confections as they pass on said final conveyor, said first and final conveyors being foraminous, a combined drip pan and reservoir positioned below said first and final conveyors, and a pump communicating with said reservoir, and a pipe extending therefrom to all of said coating means.

11. In a confection coating apparatus, a first conveyor arranged to carry dished confections, coating means associated with said first conveyor for applying a coating of material to the interior of said dished confections, an intermediate conveyor arranged to receive said dished confections from said first conveyor, a dispensor arranged over said intermediate conveyor for filling said dished confections, a freezing chamber enclosing a section of said intermediate conveyor, a final conveyor, said intermediate conveyor arranged to transport said confections to a position for placement upon said final conveyor, coating means associated with said final conveyor for applying a coating to the entire surfaces of said confections as they pass on said final conveyor, said first and final conveyors being foraminous, a combined drip pan and reservoir positioned below said first and final conveyors, a pump communicating with said reservoir, and a pipe extending therefrom to all of said coating means, an air blower, and an air conduit leading therefrom and extending over said first and final conveyors, said conduit provided with discharge slots for directing a current of air upon coatings formed on said confections.

12. In a confection coating apparatus, a first conveyor arranged to carry dished confections, coating means associated with said first conveyor for applying a coating of material to the interior of said dished confections, an intermediate conveyor arranged to receive said dished confections from said first conveyor, a dispensor arranged over said intermediate conveyor for filling said dished confections, a freezing chamber enclosing a section of said intermediate conveyor, a final conveyor, said intermediate conveyor arranged to transport said confections to a position for placement upon said final conveyor, coating means associated with said final conveyor for applying a coating to the entire surfaces of said confections as they pass on said final conveyor, and a dispensing means timed with said final conveyor for depositing a limited quantity of substance upon the tops of said confections.

In testimony whereof, I have hereunto set my hand at San Diego, California, this 30th day of March, 1931.

IRA SHAFER.